United States Patent [19]

Ide

[11] Patent Number: 5,425,584

[45] Date of Patent: Jun. 20, 1995

[54] FLUID DAMPENED SUPPORT FOR ROLLING ELEMENT BEARINGS

[76] Inventor: Russell D. Ide, P.O. Box 744, 641 Arnold Rd., Coventry, R.I. 02816

[21] Appl. No.: 164,689

[22] Filed: Dec. 7, 1993

Related U.S. Application Data

[63] Continuation of Ser. No. 876,718, Apr. 24, 1992, abandoned, which is a continuation-in-part of Ser. No. 309,081, Feb. 8, 1989, Pat. No. 5,137,373, which is a continuation-in-part of Ser. No. 283,529, Oct. 25, 1988, Pat. No. 5,112,143, which is a continuation-in-part of Ser. No. 55,340, May 29, 1987, abandoned.

[51] Int. Cl.[6] .................................. F16C 19/26
[52] U.S. Cl. .................................. 384/99; 384/581
[58] Field of Search .............. 384/99, 534, 581, 585, 384/586, 202, 215

[56] References Cited

U.S. PATENT DOCUMENTS

| | | |
|---|---|---|
| 1,664,878 | 4/1928 | Flintermann . |
| 2,424,028 | 7/1947 | Haeberlein . |
| 3,298,751 | 1/1967 | Elwell . |
| 3,456,992 | 7/1969 | Kulina . |
| 3,578,827 | 5/1971 | Smith . |
| 3,639,014 | 2/1972 | Sixsmith . |
| 3,863,996 | 2/1975 | Raimondi . |
| 3,994,541 | 11/1976 | Geary et al. . |
| 4,097,094 | 6/1978 | Gardner . |
| 4,213,661 | 7/1980 | Marmol ........................ 308/184 |
| 4,676,668 | 6/1987 | Ide . |
| 4,872,767 | 10/1989 | Knapp ........................ 384/99 |
| 4,971,458 | 11/1990 | Carlson ........................ 384/99 |
| 5,112,143 | 5/1992 | Ide ........................ 384/117 |

FOREIGN PATENT DOCUMENTS

| | | |
|---|---|---|
| 0206686 | 12/1986 | European Pat. Off. . |
| 1010959 | 6/1952 | France . |
| 2266042 | 10/1975 | France . |
| 2340470 | 2/1977 | France . |

OTHER PUBLICATIONS

Article on Advanced Multi-Squeeze Film Dampers for Rotor Vibration Control by Messrs. Heshmat and Walton.

*Primary Examiner*—Lenard A. Footland
*Attorney, Agent, or Firm*—Michael D. Bednarek; Marks & Murase

[57] ABSTRACT

A fluid dampened support for a rolling element bearing such as a ball bearing, needle bearing, roller bearing and the like. The fluid dampened support includes a network of closely spaced beams which support the outer race of the roller bearing for movement in any direction. A liquid is provided in the spaces between the beams to dampen such movement. The structure and space between the beams is designed so as to provide virtually any reasonable damping characteristics. By providing such damping characteristics, the bearings are able to limit or damp out the vibrations occurring when the supported member passes through natural frequencies before reaching operating speed. This allows use of the rolling element bearing in high speed equipment such as compressors and turbines.

23 Claims, 5 Drawing Sheets

FLUID DAMPENED SUPPORT FOR ROLLING ELEMENT BEARINGS

This application is a continuation of application Ser. No. 07/876,718 filed Apr. 24, 1992, abandoned, which is a continuation-in-part of U.S. application Ser. No. 07/309,081 filed Feb. 8, 1989, now U.S. Pat. No. 5,137,373, which is a continuation-in-part of Ser. No. 07/283,529 filed Oct. 25, 1988, now U.S. Pat. No. 5,112,143, which is a continuation-in-part of Ser. No. 07/055,340 filed May 29, 1987, now abandoned.

FIELD OF THE INVENTION

The present invention relates to rolling element bearings and, more particularly, fluid dampened rolling element bearings.

BACKGROUND OF THE INVENTION

Rolling element bearings such as ball, roller and needle bearings are used in almost every kind of machine and device with rotating parts. They are currently the most widely used bearing.

Rolling element bearings typically include four parts: an inner ring, an outer ring, the balls or rollers and a cage or separator for separating the balls from one another. The balls in ball bearings are normally made of high carbon chromium steel. The balls are heat treated to high strength and hardness and the surfaces are ground and polished. Cylindrical roller bearings are usually made of case hardened steel.

Rolling element bearings are made in a wide variety of types and sizes. Regardless of their size or shape, rolling element bearings operate on the same basic principle of allowing low friction rotation of one member relative to the other while maintaining solid metal-to-metal contact between the two elements.

For a rotating shaft, relative rotation between shaft and bearing is usually prevented by mounting the inner ring with a press fit and securing it with a nut threaded on the shaft. Excessive interference of metal must be avoided in press-fits, or the stretching of the inner ring may decrease the small but necessary internal looseness of the bearing.

Conventionally, rolling element bearings are mounted to a fixed housing so that because there is little radial play. Although the outer ring, when the shaft rotates, is mounted more loosely than the inner ring, rotational creep between the ring and the housing should be prevented.

Compared to other bearings such as conventional journal bearings, rolling element bearings offer a number of advantages. These include low starting friction; the ability to support loads inclined at any angle in the transverse plane; the ability to support thrust components of loads; and low maintenance cost. In addition the bearings are easily replaced when worn out and require less axial space than for journal bearings.

There are, however, certain disadvantages associated with conventional rolling element bearing assemblies. The cost is typically higher, more radial space is generally required than with journal bearings and more noise is generated by ball bearings, especially after wear. In addition, rolling element bearings are more subject to fatigue failure and are more easily damaged by foreign matter. All rolling element bearings have a limited life, typically less than 20,000 hours depending on the application. Another disadvantage associated with rolling element bearings is that they have very little damping capability because of the metal-to-metal contact between elements. Thus, rolling element bearings are typically less well suited to overload and shock conditions. This is a significant drawback in high speed turbo machinery.

High speed equipment such as the compressor turbine in a jet engine and aeroderivative applications such as steam turbines, gas turbines and compressors must pass through several natural frequencies before reaching operating speed. When a system operates at its natural frequency or resonance, the system/rotor vibration amplitudes become large. These vibrations can be destructive or even catastrophic if not adequately dampened. Bearings with adequate damping characteristics limit or damp out the vibrations to allow the equipment to safely pass through the critical speeds. Likewise, smaller vibrations due to unbalance can be dampened by the bearings damping characteristics.

As previously noted, rolling element bearings where metal-to-metal contact exists have very little damping capability. Accordingly, when rolling element bearings are used in jet engines or other high speed turbo machinery they must be supported in complex expensive multipart assemblies which use a squirrel cage centering spring. Examples of such constructions are shown in the following U.S. Patents: U.S. Pat. No. 3,456,992 to Kulina disclosing fluid retained between sealing rings; U.S. Pat. No. 3,863,996 to Raimondi disclosing a fluid dampened journal bearing; U.S. Pat. No. 3,994,541 to Geary et al. disclosing a fluid dampened tilt pad bearing; U.S. Pat. No. 4,097,094 to Gardner disclosing a fluid dampened pad-type bearing and U.S. Pat. No. 4,213,661 to Marmol disclosing an O-ring type damper. Another form of damper was recently proposed by Messrs. Heshmat and Walton of Mechanical Technology Inc. These so-called multi-squeeze film dampers use a spiral foil to provide a spiral multi-film damper.

There are a number of disadvantages associated with known squeeze film damper bearings. Squeeze film dampers which use a squirrel cage centering spring typically occupy an axial space 2 to 3 times larger than the axial space available for the squeeze film land. Moreover, it is very difficult to install the centering spring and center the rotor within the squeeze film clearance. For this reason, the performance of the damper is often not consistent from one engine to another. The multi-piece design and precision required to assemble such an element is also undesirable.

In process type compressors, elastomer O-rings are used as a centering spring element in addition to providing sealing at the damper ends. The elastomer rings are not reliable as spring elements and have a very narrow range of stiffness. They degrade with time and temperature. Centering the damper with the O-rings is also difficult because they tend to creep due to the static loading. O-rings are also not capable of taking any thrust load which is required in certain applications.

Another problem experienced in most conventional damper bearings is cavitation and air ingestion caused by negative pressure in the squeeze film cavity. Such cavitation is a primary cause of poor performance of conventional damper bearings.

Fluid film bearings, on the other hand, have significant damping capability from the fluid film. Of the available fluid film bearings, the so-called tilt-pad radial bearing is by far the most universally-prescribed design for machines requiring maximum rotordynamic stability because of its exceptional stability characteristics. Consequently, it has become the standard by which many other radial bearings are measured when seeking a highly stable bearing design. The tilt-pad bearing's popularity is evidenced by the large number of applications found in industry, both as original equipment, and as aftermarket replacements. Applications range from small high-speed machines such as turbochargers and compressors, to very large equipment such as steam turbines and generators.

The high rotordynamic stability comes from the reduction of cross-coupled stiffness that occurs when pads are free to tilt about their individual pivot points. This attenuates the destabilizing tangential oil film forces that can induce catastrophic subsynchronous vibration in machines equipped with conventional fixed-geometry bearings. Since so many machines are susceptible to this type of bearing-induced instability, there is a large demand for quality tilt-pad bearings.

Because of its many moving parts and manufacturing tolerances, the tilt-pad design is also the most complex and difficult to manufacture of all journal bearing designs. The design complexity is evident in the number of highly-machined parts required to make up the bearing. Clearance tolerances are additive in the built-up assembly of shell, pivots, and pads, requiring a high degree of manufacturing accuracy to yield acceptable radial shaft clearances. Pad pivot friction under high radial load can also lead to premature wear, or even fatigue failure, which can enlarge clearances and increase rotordynamic unbalance response. All of these requirements combine to make the tilt-pad bearing one which demands maximum attention to design, manufacturing, and materials.

Many of today's modern turbomachines, especially those running at high speeds and low bearing loads, require the superior stability characteristics of tilt-pad journal bearings to prevent rotordynamic instabilities. Until now, the design complexity of tilt-pad bearings has precluded their use in many small, high-volume applications where cost and size are important.

The present inventor has developed an improved, less complicated moving pad bearing construction. For example, U.S. Pat. No. 4,496,251 a pad which deflects with web-like ligaments so that a wedge shaped film of lubricant is formed between the relatively moving parts.

U.S. Pat. No. 4,515,486 discloses hydrodynamic thrust and journal bearings comprising a number of bearing pads, each having a face member and a support member that are separated and bonded together by an elastomeric material.

U.S. Pat. No. 4,526,482 discloses hydrodynamic bearings which are primarily intended for process lubricated applications, i.e., the bearing is designed to work in the working fluid. The hydrodynamic bearings are formed with a central section of the load carrying surface that is more compliant than the remainder of the bearings such that they will deflect under load and form a pressure pocket of fluid to carry high loads.

It has also been noted, in Ide U.S. Pat. No. 4,676,668, that bearing pads may be spaced from the support member by at least one leg which provides flexibility in three directions. To provide flexibility in the plane of motion, the legs are angled inward to form a conical shape with the apex of the cone or point of intersection in front of the pad surface. Each leg has a section modulus that is relatively small in the direction of desired motion to permit compensation for misalignments.

U.S. Pat. No. 5,054,938 also to Ide discloses a number of bearings particularly well-suited for high speed equipment. The bearings include fluid dampened support structures.

Such deflection pad bearings offer exceptional damping characteristics. In addition to the damping typically associated with tilt pad bearings, the support structure and fluid located between the webs also provide damping. It is even possible to provide an oil filled diameter membrane to increase damping. Moreover, because these bearings function without contact between moving parts they offer the possibility of virtually infinite life.

Despite the advantages offered by these bearing constructions, they have not yet been universally accepted. This can be attributed, at least in part, to the revolutionary nature of these bearings and the fact that they are a radical departure from "conventional" thinking in the field of rotordynamics. In addition, when a fluid film bearing fails it often can completely seize without warning. The results could be catastrophic in a jet engine, for example. On the other hand, failure of a rolling element bearing is usually gradual and indicated by the increasing noise generated by the bearing. Moreover, rolling element bearings work, to some extent, even without lubricant. This certainly accounts for the continued use of rolling element bearings in jet engines, but does not explain the continued use of rolling element bearings in applications where loss of lubricant is less catastrophic, e.g., aeroderivative applications. For whatever reason, there remains a preference among some in the field for rolling element bearings. There is a need, therefore, for a simple inexpensive reliable system which provides good damping characteristics for rolling element bearings.

SUMMARY OF THE INVENTION

The present invention discloses a fluid dampened support for a rolling element bearing and methods of making the same. The bearings offer many of the rotordynamic advantages of tilt-pad bearings without sacrificing the advantages of rolling element bearings. This is achieved by applying the deflecting support principle, previously used on movable pad bearings to rolling element bearings. These principles are described in co-pending parent application Ser. No. 07/309,081 filed Feb. 8, 1989 the complete disclosure of which is incorporated herein by reference. Thus, the support member which is preferably unitary, can be formed from a single piece of heavy walled tubing or a cylindrical journal that has been machined or formed with small grooves and slits, bores or cuts through or on the bearing wall to define a support surface and a flexible support structure.

All of the essential parts of the support structure are integrally formed from a single piece of material. This allows the bearing to be manufactured for much less than conventional designs. Moreover, because all of the component parts are integral, their position relative to each other is fixed. This allows the bearings to be manufactured to much closer tolerances than multipart assemblies where the tolerances of each part are additive.

The present invention also relates to a dampening structure into which a rolling element bearing can be inserted. Virtually any reasonable dampening characteristic can be developed by controlling the structure and space between beams. Additionally, a flexible fluid dampened membrane may be used to support the support structure at the outer diameter.

The fluid dampened rolling element bearing according to the present invention includes an inner race; an outer race; and a series of balls or other rolling elements disposed between the inner race and the outer race such that the inner race is rotatably supported on the outer race by the rolling elements. A support structure is provided for supporting the outer race for radial and torsional movement. The support structure performs the function of a squeeze film centering ring in conventional damper assemblies. The support structure comprises a plurality of circumferentially spaced members separated from one another by narrow spaces. An incompressible fluid is provided in these spaces to allow fluid dampening.

The assembly is designed such that a space is provided between every point on the outer race and the outer periphery of the support member. If desired, the support structure may be in the form of a one-piece member formed with cuts and grooves to define a plurality of beams. The cuts and grooves can be formed through electric discharge machining so as to provide very narrow openings to enhance the fluid dampening effect. The support structure can be formed separate from the outer race to allow fluid dampened support of conventional, off the shelf rolling element bearings. Moreover, the support structure can include a continuous inner ring for supporting the outer race of the rolling element bearing or alternatively the inner ring could be formed by a series of special pads rather than a continuous ring. Other constructions are, however, possible. For example, the continuous inner ring and the outer race of the bearing could be integrally formed.

The support structure may include a fluid dampened membrane so that the support structure functions as a squeeze film damper. The support structure is designed to optimize the damping characteristics of the support structure. This can be done by modifying the support structure. The support structure can be designed to support the support surface for movement in up to six degrees of freedom (i.e., translation or movement in the +x, −x, +y, −y, +z and −z directions) and rotation about the X, Y, and Z axes so as to ensure damping at all times.

The support structure is preferably unitary (one-piece) and comprises support stubs, beams, and/or membranes connected to a housing which is sometimes defined by the radially outermost portion of the bearing in the case of a journal bearing or, in the case of thrust bearings, a housing into which the bearing is mounted.

The inventor has discovered that in many specific applications such as in high speed applications, it is necessary to examine and evaluate the dynamic flexibility of the entire system consisting of the shaft or rotor, the bearing and the fluid dampened support structure. In computer analysis of this system using a finite element model, it has been determined that it is necessary to treat the entire support structure as a completely flexible member that changes shape under operating loads. By adding more or less flexibility via machining of the basic structure, damping characteristics may be achieved that provide stable low friction operation over wide operating ranges. A number of variables have been found to substantially affect the support structures damping characteristics. Among the most important variables are the shape, size, location and material characteristics (e.g. modulus of elasticity etc.) of the support members defined by the bores, slits or cuts and grooves formed in a one piece member. The shape of the support members has been found to be particularly important. Also by providing a fluid backing to the flexible members, a high degree of damping may be achieved that further adds to system stability.

While there are numerous arrangements of bores, grooves, cuts, or slits there are primarily two modes of deflections: namely, one or more ligaments or membranes which deflect in the general direction of load in a bending mode and secondly, by torsional deflection in a beam or membrane in a direction extending away from the support surface along the longitudinal axis of the shaft. The degree of deflection in the bending mode is, in part, a function of the stiffness of the support structure in the radial direction. The cuts are specifically made to result in a predetermined shape under load. By surrounding or backing certain ligaments or membranes with lubricating fluid, an additional damping element may be added to the design.

Though various designs are possible, there are two key performance characteristics which the damper should have. First, the structure should have sufficient flexibility to ensure that actual squeezing of the fluid film occurs. Second, the damper should be capable of damping unbalanced loads in all directions.

The thickness of the gap between damper parts (corresponding to the squeeze film thickness) and the required flexibility are necessarily interrelated. The clearances between the damper parts must be small enough that the flexibility allowed by the support structure is sufficient. It is noted, in this regard, that pressure is a cubic function of thickness, i.e., pressure is proportional to the third exponential power of thickness. If the gap is very small then the support structure does not have to be so flexible.

Because the support structures of the present invention are essentially one-piece continuous beam networks, they are, of course, relatively rigid in comparison to soft spring dampers. This rigidity offers significant advantages in terms of stability and wear. On the other hand, it requires a relatively small space between the damper parts. Thus, to achieve proper squeeze film characteristics with the bearings of the present invention, the largest allowable space between damper parts is normally 3–5 mil and certainly not more than 8 mil. This does not present a significant problem because, in accordance with the present invention, the cuts which define the space between damper parts can be made using wire cut EDM (electrical discharge machining). Many EDM machines are capable of making cuts as small as 1 or 2 mil. If other machining techniques are used, such as a conventional wire cut EDM which leaves a gap of 10 mil or more, the space can be reduced by placing a separate shim in the gap.

In the support structures of the present invention, the flexibility depends primarily on the length and cross-section of the beams or ligaments which support the damper parts. The deflection characteristics of any particular beam configuration can easily be obtained from a structural engineering handbook.

The bearing assembly of the present invention is especially well-suited for use in jet engines where damping is critical. Other specific applications of the bearings of the present invention include electric motors, fans, turbochargers, internal combustion engines, outboard motors, and compressors/expanders.

The support structure member may be formed of metals, powdered metals, plastics, ceramics or composites. The bearing can be tuned by, for example, changing the support structure and gaps to alter the stiffness. This in turn eliminates vibration. The present invention also contemplates easily moldable support structures which include no hidden openings such that they can be molded in a simple two-piece mold.

Various methods of manufacturing the supports of the present invention are also contemplated. The selection of a particular method of manufacturing depends largely on the volume of the particular support to be manufactured and the materials used.

In low volume applications, or when it is desired to produce prototypes for testing and/or production of molds or the like, the supports are preferably manufactured from metallic cylindrical blanks such as heavy wall tubing or other journals which are machined to provided radial and/or facing bores or grooves and formed with radial cuts or slits through either numerically controlled electrical discharge manufacturing techniques, numerically controlled laser cutting techniques, or numerically controlled water-jet cutting.

In intermediate volumes, the supports of the present invention are preferably manufactured using an investment casting method in accordance with the present invention.

In high volume applications, the supports of the present invention can be manufactured using a wide variety of materials such as plastics, ceramics, powdered and non-powdered metals, and composites. In high volume applications, a number of manufacturing methods, including injection molding, casting, powdered metal, die casting, and extrusion, can be economically employed. The supports of the present invention can be formed in a shape which is easily moldable.

The present invention offers a number of advantages over conventional designs. Unlike squirrel cage spring dampers, the present invention does not require any additional axial space beyond that already provided by the bearing. Unlike elastomer O-ring dampers, the present invention can accommodate a very wide range of stiffness values which can be predicted accurately and will not change with time or temperature. The damper of the present invention is also capable of taking a thrust load. Moreover, unlike many of the designs used with fluid film bearings which utilize a multiple of sector beams to provide a flexural support, the present invention includes a one piece support structure which can also be split for ease of assembly. The one piece construction allows for greater precision and ease in assembly by avoiding the problems of tolerance stack up which are inevitable with multipart designs. Further, unlike any of the existing squeeze film damper bearing designs, the present invention allows for changing of the squeeze film clearance space by, for example, inserting shims in the space to fine tune the design.

In operation, the construction of the present invention can isolate the squeeze film region into several pockets and prevents interaction between the cavities. This allows for maximizing of the damping that can be obtained from the damper. In the design of the present invention, the static weight offset can be accurately accounted for during the manufacturing of the ring. No special assembly routines will be needed to account for the static weight offset. The support structure can readily accept any existing antifriction bearing or fluid film bearing with only minor modifications to the bearing housing.

Finally, unlike any of the existing squeeze film damper designs, the present invention allows for only positive pressure generation in the damper bearing. The squeeze film cavities are designed so that separation of the surfaces does not follow as the journal moves away. This prevents the formation of negative pressure in the squeeze film cavity. Therefore, cavitation and air ingestion, which is a primary factor for the poor performance in most damper bearings, is completely eliminated.

DETAILED DESCRIPTION OF THE ILLUSTRATIVE EMBODIMENTS

In describing the bearings and especially the support structure of the present invention in an understandable way, it is helpful to describe the support structures as being formed from a cylindrical blank by providing grooves, slits, bores and other openings in the cylindrical blank. As noted below, this is sometimes a useful technique for manufacturing a prototype support structure. The reference to the cylindrical blank is, however, primarily intended to assist understanding of the present invention. Although many of the support structures of the present invention could be manufactured from a cylindrical blank, it is not necessary that any of them be so manufactured. Indeed the support structure can be manufactured in numerous ways, some of which are discussed hereinafter.

Thus, the support structure may be described as a journal machined to define an inner peripheral ring or set of pads for supporting the outer race of the rolling element bearing, an outer periphery supported in housing and a network of beams and membranes providing flexible support for the inner periphery, and hence the bearing relative to the outer periphery and housing.

The primary flexibility of the support structure of the present invention is developed by small cuts or slits through the journal wall. These cuts provide the inner peripheral ring or pads with up to six degrees of freedom (i.e., the ring or pads can translate in the $+x, -x, +y, -y, +z$ and $-z$ directions as well rotate about the x, y and z axes) and are designed to optimize the damping characteristics of the support structure. The cuts or slits can be provided to provide a continuous cylindrical membrane. The membrane acts as a fluid damper upon which the remainder of the support structure and the rolling element bearing are supported. The flexibility of the membrane, combined with the fluid lubricant, provides a means to vary the damping action and to isolate the pad from the housing. The damping takes the form of a dash pot that exhibits high damping characteristics.

Figure 1:
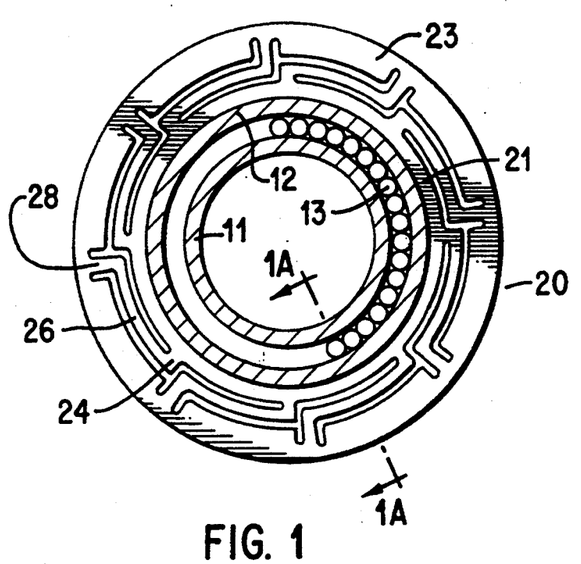
FIG. 1 is a sectional view of a rolling element bearing assembly which includes one form of fluid dampened support structure according to the present invention.

Referring first to FIG. 1, one of the currently preferred embodiments of the present invention is shown. The roller bearing assembly shown therein includes conventional rolling element bearing components such as the inner race 11, outer race 12 and rolling elements 13 such as balls or rollers. These components are of a conventional construction. Indeed, this portion of the assembly may be provided through the use of a simple "off the shelf" ball, roller, or needle bearing assembly. Many such assemblies include additional components such as, for example, a cage to separate the rolling elements from one another.

In accordance with the present invention, the conventional rolling element bearing components 11, 12 and 13 are supported by fluid dampened support structure generally indicated at 20. The support structure 20 is formed with grooves and slits so as to define a continuous inner ring 21, an outer periphery 23 and a network of circumferentially spaced beams 24, 26 and 28 the inner ring 21 serves as a support surface for supporting the outer race 12. The outer periphery 23 is adapted to be supported in a rigid housing or the like. The network of circumferentially spaced beams 24, 26 and 28 support the radially inner support surface 21 and hence the inner race 11, outer race 12 and rolling elements 13 of the assembly for movement relative to the outer surface 23.

As shown in FIG. 1, the beam network includes a series of eight stub-like beams 24 which provide the only connection between the beam network and the inner support ring 21. Each of the stub-like beams 24 is connected at one end to the inner ring 21 and at its other end to a circumferentially extending beam 26. The circumferential beams 26 are each connected to the stub section or beam 24 at one end and to a second stub-like beam 28 at the opposite end such that the beams act as cantilever supports. The beam sections 28 are in turn connected to the circumferential beams 26 at one end and to the outer periphery 23 at their opposite end. As can be seen from FIG. 1, the cuts and slits are arranged to provide an open space between every point on the inner support surface and the outer periphery of the support structure. This gives the support structure significant radial flexibility.

Figure 1A:
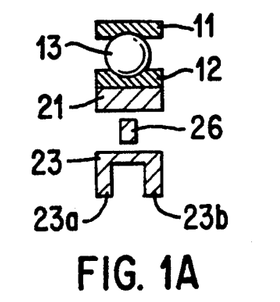
FIG. 1A is a sectional view along the lines indicated in FIG. 1.

If additional flexibility is desired, facing grooves can be formed on the sides of the support structure to reduce the torsional stiffness of the support structure. In particular, as shown in FIG. 1A axially extending facing grooves can be provided on each side of the support structure so as to reduce the axial dimension of one or more of the beams and the support structure thereby reducing the torsional stiffness of the beam.

If even more dampening is desired, a radial extending groove can be formed in the outer periphery of the support structure 23 so as to define a membrane upon which the beams are supported. Specifically, as shown in FIG. 1A the provision of a groove results in formation of two circumferential beams 23a, 23b which are connected to another body and membrane the thickness of which is dependent upon the depth of the groove.

When used in high speed equipment such as jet engines, the rolling element bearings are typically located in a sealed chamber which is flooded with lubricant to remove the heat generated by the movement of the rolling elements. When the rolling element bearing assembly of the present invention is located in such a flooded chamber the lubricant will naturally fill the spaces between the various beams. The fluid located in the interstices of the support acts like fluid in a dashpot to provide dampening of the movement of the beams in the support structure.

Figure 2:
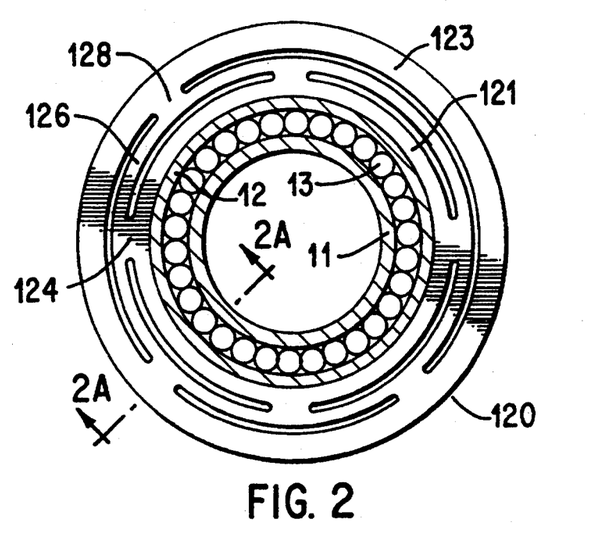
FIG. 2 is a sectional view of a second rolling element bearing assembly according to the present invention.

Another currently preferred embodiment of the support structure of the present invention is shown in FIG. 2. As shown there, the rolling element bearing assembly, illustrated somewhat schematically, again includes an inner race 11 and outer race 12 and rolling elements 13. The support structure generally indicated at 120 includes a continuous inner ring 121, an outer periphery 123 and a network of beams 124, 126 and 128. Again, the network of beams is formed by a spaced series of slits formed in a continuous journal. In this case, however, the slits are all circumferential as shown in FIG. 2. The nature of these support structures is, however, essentially the same. Specifically, the support structure includes a series of, in this case, four stub sections or beams 124. A series of circumferential beams 126 connected at one end to the stubs 124 and at the opposite end to stubs 128. The stubs 128 are connected at their opposite end to the outer periphery 123. From FIG. 2, it can be seen that each stub 124 has two circumferential beams 126 extending therefrom and that each of the secondary stubs 128 supports two circumferential beams 126. Again, the support structure is arranged so that there is an open space between every point on the inner ring 121 and every point on the outer periphery 123.

Figure 2A:
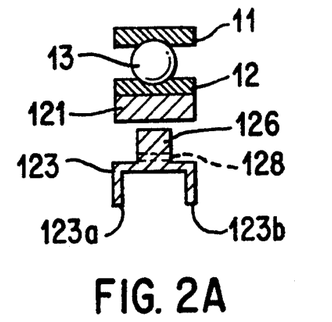
FIG. 2A is a sectional view along the lines indicated in FIG. 2.

Additionally, as with the previous embodiment, if desired, torsional flexibility can be added to the support structure by providing axially extending facing grooves on the sides of the support structure. Specifically, as shown in FIG. 2A the support structure can be provided with facing grooves to reduce the torsional stiffness of one or more of the beam elements. If even more damping is desired, a radially inward extending groove may be formed in the outer periphery 123 so as to provide a membrane support for the beam network. The provision of the radially inwardly extending groove defines two circumferentially extending beams 123a, 123b supporting the membrane as shown in FIG. 2A.

When the bearing assembly shown in FIG. 2 is located in a flooded container such as that used in high speed applications, the lubricant will fill the gaps between the beam elements and also fill the base underlying the membrane. In this way, the lubricant will act as a fluid dash pot to dampen movement of the support structure elements.

Figure 4:
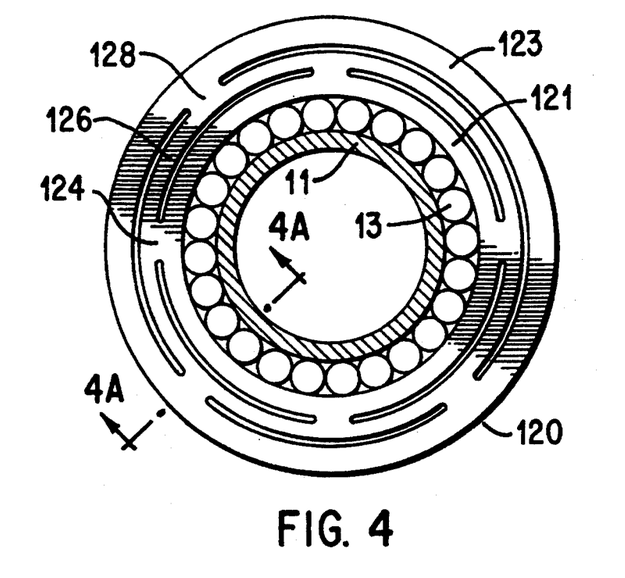
FIG. 4 is a sectional view of a rolling element bearing having a fluid dampened support structure integrally formed with the outer race.
Figure 4A:
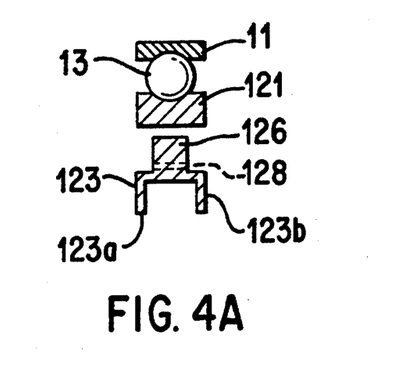
FIG. 4A is a sectional view along the lines indicated in FIG. 4.

The previous embodiments disclose support structures which are particularly well suited for retrofit applications in which the conventional bearing is provided with a separate support structure to provide the desired damping. This is currently the most likely application of the invention. It should be understood, however, that the inner ring 21, 121 of the support structures disclosed herein could, if desired, be used as the outer race of the rolling element bearing assembly. An example of such a construction is shown in FIGS. 4 and 4A and discussed below. Such an assembly can simplify the assembly if assembly were to be built entirely in one location. Of course, the outer race of typical rolling element bearings must have certain material characteristics which might require more expensive material than one might want to use on the support structure. Accordingly, it still may be advantageous to form the outer race and the inner ring of the support structure separately.

In addition, in the previously described embodiments, the inner support ring is continuous. This ensures that the rolling element bearing and particularly the outer race can be securely retained by the support structure. It is, however, possible to use support structures in which the outer race is supported in a circumferentially spaced pads rather than on a continuous ring. Support structures having such a circumferentially spaced series of pads can be designed along the principles described in the previous application and used for bearings.

The use of separate pads rather than a continuous ring offers both advantages and disadvantages. One disadvantage associated with support structures having separate pads for supporting the outer race is that as the deflection of one pad occurs, the tightness of the fit of another pad is loosened. To accommodate this, the outer race must be pressfit to some extent in the support structure. There is also a greater possibility for unbalanced damping when separate pads are used. This can, however, be minimized by designing the support structure such that the loads are evenly shared. A major advantage of separate pad supports is that their performance is more easily modeled and reliably predicted. Additionally, separate pad supports have greater flexibility. At present both continuous and separate pad supports appear to be promising. Accordingly, there is no universal preference for one or the other at this time. The selection of one or the other must therefore be made on a case by case basis taking the foregoing into consideration.

Figure 3:
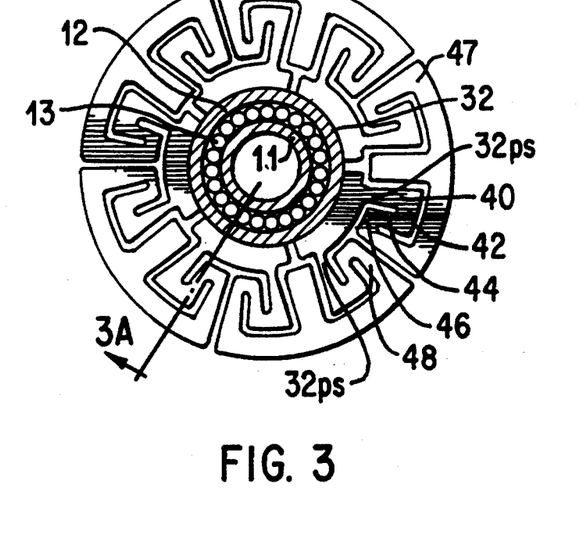
FIG. 3 is a side view of another fluid dampened support structure according to the present invention.
Figure 3A:
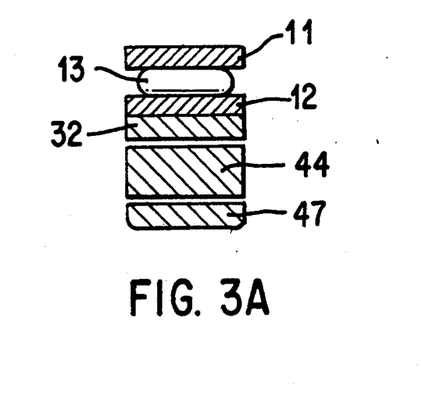
FIG. 3A is a radial cross-section of a portion of the support structure illustrated in FIG. 3.

FIGS. 3 and 3A illustrate one such separate pad embodiment. More specifically, FIGS. 3 and 3A illustrate the possibility of using a journal bearing as multipad support structure in accordance with the present invention. It should be appreciated, however, that a wide variety of support structure arrangements with a separate pad could be constructed in accordance with the principles previously set forth in the application incorporated herein by reference.

The construction illustrated in FIGS. 3 and 3A is bi-directional, i.e., the structure is symmetrical about its center line. Like the previously described supports, the support of FIGS. 3 and 3A is formed with a plurality of thin radial and circumferential slits. In this case, however, the slits define a plurality of circumferentially spaced support pads 32.

The structure supporting each of the support pads 32 is such that each pad 32 is supported by a beam support structure at two pad support surfaces 32ps. The beam network connected to the support pads at each pad support surface 32ps is identical, yielding the symmetrical construction which makes the support bi-directional. For purposes of simplifying this description, only the network of beams which supports the pad at one pad support surface will be described since the other pad support surface supported in an identical fashion. Thus, as shown in FIGS. 3 and 3A, a first, generally radially extending beam 40 is connected to the pad 32 at the pad support surface 32ps. A second, generally circumferential beam 42 is connected to the radially outermost end of beam 40. A third, generally radial, beam 44 extends radially inward from the beam 42. A fourth, generally circumferential beam 46 extends from the radially innermost portion of the beam 44. A fifth, generally radial beam 48 extends radially outwardly from a beam 44 to the housing portion 47 of the support structure. In summary, each pad 32 is supported by ten beams and the bearing housing.

Further, by forming radially extending circumferentially spaced grooves or continuously extending circumferential grooves in the housing portion of the support structure, the housing portion of the support structure can be designed to act as a plurality of beams or membranes. Thus, as a result of the beam on beam two point support, the pad acts like a spring-like membrane.

As mentioned above, in some instances it may be desirable to make the inner support ring of the support structure integral with the outer race of the rolling element bearing. FIGS. 4 and 4A illustrate such an assembly. As shown therein, assembly is essentially identical to that of FIGS. 2 and 2A except that the outer race of the bearing and the inner ring of the support structure are a single piece.

The assembly shown in FIG. 4 is not, however, currently preferred. As known to those skilled in the bearing art, the races of rolling element bearings must be manufactured to exacting specifications and often made of durable materials. It is currently expected that providing such a race integrally with the support structures of the present invention might be unduly complicated. For these reasons, the integral construction shown in FIGS. 4 and 4A is not currently preferred. Nevertheless, it should be appreciated that construction shown in FIGS. 4 and 4A operates in essentially the same way as the construction shown in FIGS. 2 and 2A.

While certain examples are described above, it should be appreciated that numerous modifications to the support structure are possible. For example, the deflection and damping characteristics of the support structure can be modified by changing the angle of the beams, changing the location of the holes or openings which define the legs, varying the length of any of the beams or membranes, and changing the width or thickness of any of the beams or membranes. Other possible modifications of beam mounted support structures are described in co-pending applications Ser. No. 309,081 incorporated by reference above.

As noted earlier, there are two key performance characteristics which the damper should have. First, the structure should have sufficient flexibility to ensure that actual squeezing of the fluid film occurs. Second, the damper should be capable of damping unbalanced loads in all directions.

The thickness of the gap between damper parts (corresponding to the squeeze film thickness) and the required flexibility are necessarily interrelated. The clearances between the damper parts must be small enough that the flexibility allowed by the support structure is sufficient.

Because damping pressure is a cubic function of thickness, the gap must be very small to accommodate the moderate flexibility of the support structures of the present invention. To achieve proper squeeze film characteristics with the bearings of the present invention, the largest allowable space between damper parts is normally 3-5 mil and no more than 8 mil. Accordingly, the cuts which define the space between damper parts are preferably made using wire cut EDM (electrical discharge machining). Many EDM machines are capable of making cuts as small as 1 or 2 mil. If other machining techniques are used, such as a conventional wire cut EDM which leaves a gap of 10 mil or more, the space can be reduced by placing a separate shim in the gap.

In the support structures of the present invention, the flexibility depends primarily on the length and cross-section of the beams or ligaments which support the damper parts. The deflection characteristics of any particular beam configuration can easily be obtained from a structural engineering handbook.

Figure 9:
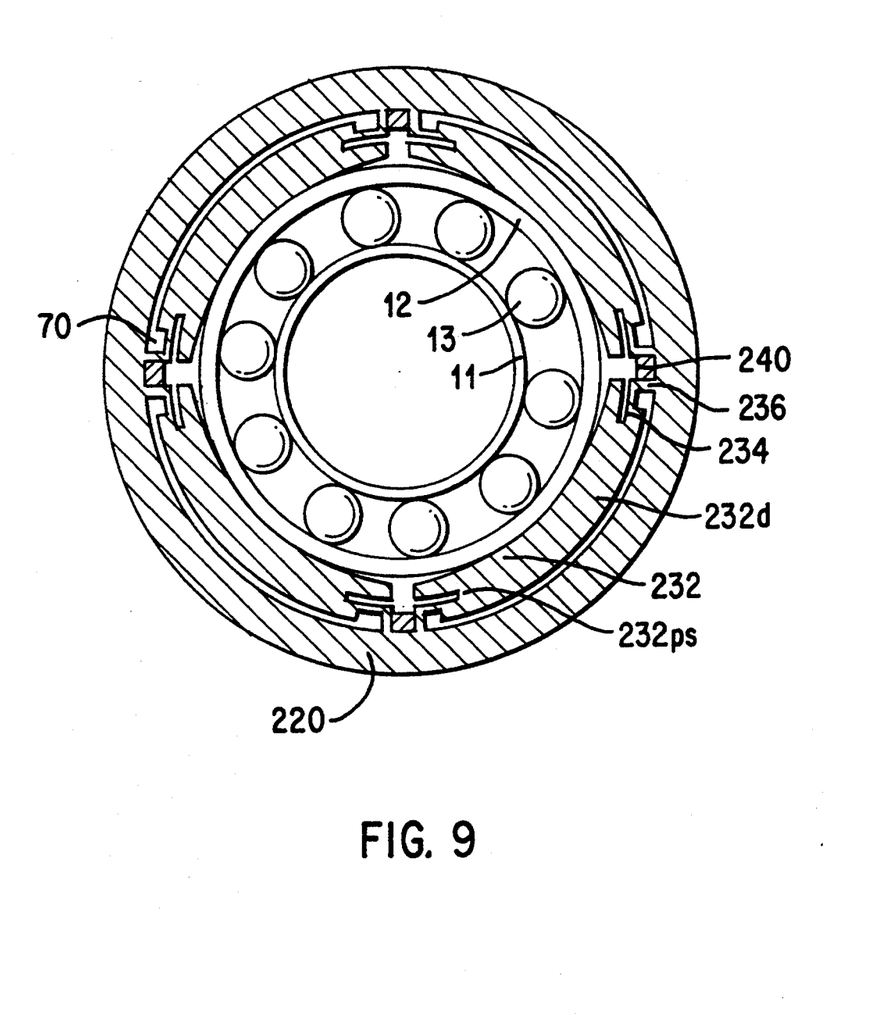
FIG. 9 is a sectional view of another rolling element bearing assembly according to the present invention.
Figure 9A:
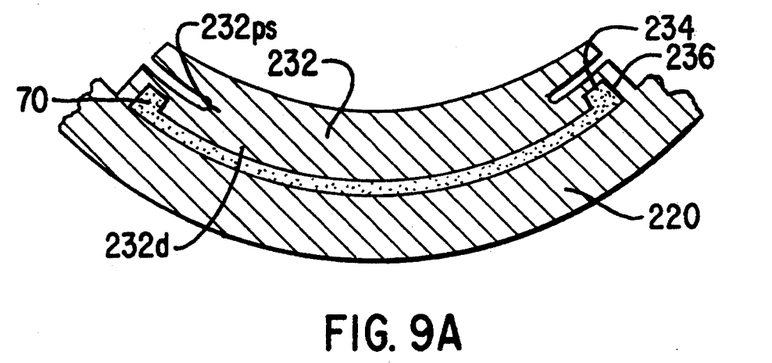
FIG. 9A is a detail view showing one section of the support structure of the assembly shown in FIG. 9.
Figure 9B:
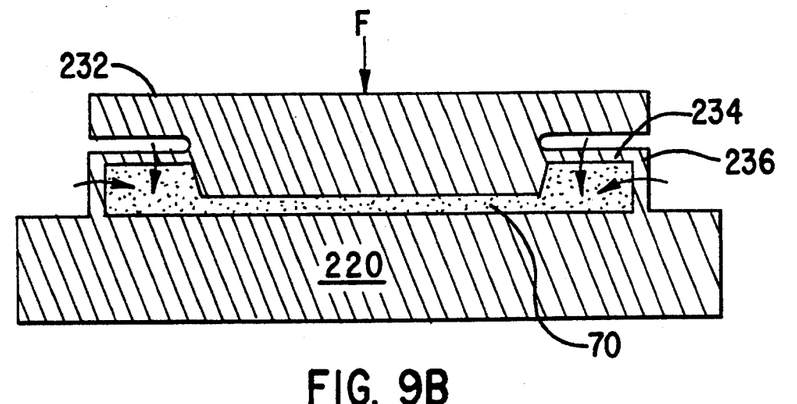
FIG. 9B is a simplified model of the damper structure depicted in FIG. 9A.
Figure 9C:
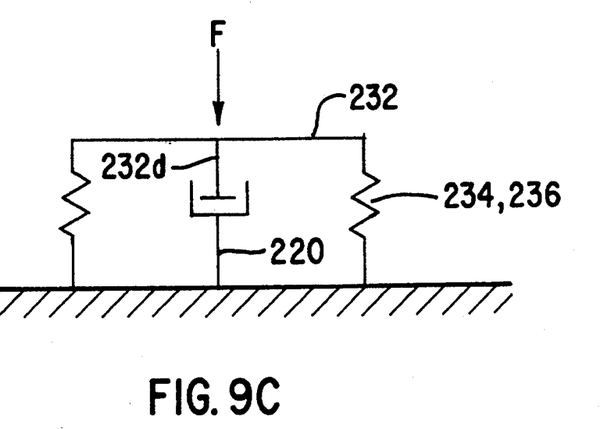
FIG. 9C is a schematic representation of the damper structure depicted in FIG. 9B.

Taking these factors into account, another currently preferred embodiment of the present invention which is depicted in FIGS. 9-9C will be described. As shown in FIG. 9, this embodiment is of a pad type support structure. The support structure includes four circumferentially spaced pads 232. Each of the pads 232 rest on a pad surface 232ps which is supported by a dog legged shaped beam network. More specifically, the beam network includes a circumferential beam 234 extending from each circumferential end of the pad support surface 232ps and a radial beam 236 extending radially at a sharp angle away from the circumferential beam 234 to the outer periphery portion 220.

As can be appreciated from FIGS. 9 and 9A, the beams 234 and 236 are quite thin. On the other hand, the beams are relatively short. Thin beams tend to be more flexible, but short beams tend to be less flexible. Thus, the support structure as a whole would have a moderate flexibility. The specific dimensions necessary can be determined either through trial and error or, preferably, through finite element analysis. The pad member 232 also includes a damper portion 232d at the radially outermost portion thereof. The damper portion 232d extends radially outward to define a thin squeeze film gap with the outer periphery portion 220. As mentioned before, the gap should be, normally, in the range of 3-5 mil. The gap is filled with a hydraulic fluid 70 or the like.

The support structure is essentially formed from a single piece. If it is desired to control deflection of the radial beams 236 in one direction, however, deflection control inserts 240 can be inserted into the support structure to prevent the beam 236 from deflecting away from the beams 234. As explained below, such deflection is neither necessary nor desired to achieve damping performance. Instead, beam 236 must deflect in the direction indicated in FIG. 9B to achieve proper damping.

As shown in FIG. 9, the pads 232 of the support structure are formed with a larger diameter than the outer diameter of the rolling element bearing to provide a positive preload. Such machining of different diameters for each of the pad is somewhat more expensive than simply milling a uniform diameter, but such pad construction offers a performance advantage in the construction shown in FIG. 9. In particular, loads from the shaft or bearing are received on or near the circumferential center of the pad 232 so that the pad acts as a damper and deflects virtually radially rather than with a wedge shape as in a hydrodynamic bearing. In other words, supporting the outer race only at or near the center of the pads causes the force on the support structure to act at or near the center so that the structure functions as shown in FIGS. 9B and 9C with the load applied centrally. This ensures proper damper performance.

In the structure shown in FIGS. 9 and 9A, the support structure, i.e., squeeze film centering spring, includes four distinct segments which form a continuous ring. Naturally, the number of segments can be varied if desired. It should be noted, however, that damping values can become undesirably low if too many segments are used.

With the assembly shown in FIG. 9 and 9A, as the bearing whirls or vibrates, it tends to displace one or two of the segments at any particular time. This will cause the segments to move radially and squeeze the oil 70 in the small clearance cavity. The squeezing action will generate a pressure which when multiplied by the area results in a force proportional to the velocity of the journal. This force is a damping force that tends to dampen and reduce the vibration levels in addition to the forces transmitted to the bearing housing and structure.

The thickness and length of the web sections at both ends of each segment determines the stiffness of the support. A wide range of stiffness values can thus be achieved with dimensional change to these critical sections. The squeeze film cavity can also be shimmed to vary the clearance between the damper portion and the outer periphery portion so as to fine tune the damper performance. For horizontal applications, i.e., applications in which the shaft is not displaced from the horizontal position, the bottom two segments can be sized to account for the static weight offset thus eliminating the need for delicate and difficult field adjustments. Multiple cavities or segments can be designed so as to work in series or parallel with the cavity shown and thus provide a wider range of design capability.

In simple terms, the damper construction shown in FIG. 9 and 9A operates as a simple fluid dashpot as represented schematically in FIG. 9C. This can best be understood by reference to FIG. 9B which is a simplified version of the segment depicted in FIG. 9A. Thus, although the segment depicted in FIG. 9A is circumferential, it is useful to consider it as a straight structure of the type shown in FIG. 9B. Because the pads 232 have a larger diameter than the outer race 12 of the rolling element bearing, the force applied to the support structure of the shaft or bearing acts at or near the circumferential center of the pad as shown in FIG. 9B. This force F causes the beams 234 and 236 to deflect in the direction indicated by the small arrows such that the damper portion 232d of the pad 232 squeezes the narrow film between it and the outer periphery 220.

This system may be schematically represented as shown in FIG. 9C as a dashpot with springs at each end of the supported member 232. In this case, the beams 234, 236 provide the spring function and the damper portion 232d and outer periphery 220 along with the fluid film therebetween provide the dashpot performance.

An important aspect of the present invention is the disclosure of machinable support shapes, i.e., support shapes which can be produced by machining a piece of heavy walled tubing or similar cylindrical journal using standardly available machining techniques. Such supports are characterized by the fact that they are formed from a piece of heavy walled tubing or similar cylindrical journal through the provision of bores, slits and grooves. The advantage of such supports is that it is easy to manufacture prototypes and to modify these prototypes after testing. Naturally, when the supports are to be mass produced, using, for example, molding or casting techniques, different manufacturing considerations may dictate different shapes. It is important to recognize that changes in shape affect support performance.

Another manufacturing consideration is ease of molding. Naturally, most of the support structures of the present invention are capable of being molded by some molding technique. Only certain shapes can, however, be injection molded in a simple two-piece mold, i.e., a mold which does not include cams. The supports of the present invention can be constructed with easily moldable shapes which are defined as shapes which can be injection molded using a simple two-piece mold. An easily moldable shape generally is characterized by the absence of "hidden" cavities which require cams for molding. Accordingly, an easily moldable shape includes no radially extending grooves in the inner and outer diameter and a continuous axial cross section.

The dimensions and deflection variables including number, size, shape, location and material characteristics of the elements defined in the unitary support structure can be tailored for any specific application to support a wide variety of loads. Of these variables, the shape of the support members is particularly important. The impact of shape of the support members on the deflection characteristics of the support structure can be appreciated when the variable formula for moment of inertia $bh^3/12$ (English units) (the main component of sectional modulus for rectangular section, $z = I/c = bh^2/6$) is used as an example. Moreover, the ability of the support ring or pad to move with six degrees of freedom allows the support to compensate for and correct shaft misalignment. In this regard it is noted that the supports of the present invention have a self-correcting characteristic resulting from the tendency of the support to return to its non-deflected state due to the stiffness of the support. Of course, the stiffness of the support is primarily a function of the shape of the support structure, and to a lesser extent the other deflection variables, including number, size, location, and material characteristics of the elements defined by the grooves and cuts or slits formed in the unitary element. Stiffer supports have a greater self-correcting tendency but are less able to adjust for shaft misalignment.

In small quantities, the support structures disclosed herein are preferably constructed by electrical discharge machining or laser cutting methods. The double lines shown in the drawings are the actual paths of the wire or beam which is typically 0.002–0.060"(0.50–1.52 mm) in diameter. The lubricant that flows into the electrical discharge machined paths acts as a fluid dampener that reduces any vibration or instability at resonant frequencies. In the situations described above where a continuous cylindrical membrane is formed, the damping takes the form of a dash pot that exhibits high damping characteristics. With the novel approach of tuning or modifying the stiffness of the bearing configuration or structure and particularly the beam to suit a particular bearing application, optimum performance is readily obtained. Recent computer analysis has demonstrated that virtually any stiffness or deflection may be accomplished.

As noted above, when manufacturing low volumes or prototypes of the support structure of the present invention, the support structure are preferably constructed by electrical discharge machining or laser cutting methods. Such small volumes or prototypes are usually constructed of metal. However, when higher volume production of a particular bearing is contemplated, other methods of manufacture such as injection molding, casting, powdered metal die casting and extrusion are more economical. In connection with such manufacturing methods, it may be more economical to use plastics, ceramics, powdered metals or composites to form the support structure of the present invention. Methods such as injection molding, casting, powdered metal die casting with sintering and extrusion are sufficiently well known that the processes need not be detailed herein. Once a prototype bearing is constructed, the method of producing a mold or the like for mass production of the support structure is well known to those skilled in the molding and casting art. Moreover, it is to be understood that only certain types of the support structure of the present invention are adapted to be made in high volumes through extrusion. Generally, these are the support structures that are formed only through the provision of circumferential grooves and radial and circumferential cuts or slits which extend axially throughout the entire support structure, i.e., those support structure having a constant or otherwise extrudable cross-section.

Investment casting may be used in the manufacture of intermediate quantities, e.g., less than 5,000 support structures. The first step of the investment casting procedure is manufacture of a prototype. The prototype can be manufactured in any number of ways, but is preferably manufactured by machining a piece of heavy walled tubing or similar cylindrical journal. In larger support structures, the cylindrical journal typically is machined using a lathe for forming face and circumferential grooves, and a mill for forming axial and radial bores. In machining smaller cylindrical journals, techniques such as water-jet cutting, laser and wire electrical discharge techniques are generally more suitable. In either application, the journals are typically turned and milled to form the larger grooves.

After the prototype is formed, it may be desirable to test the prototype to confirm that the support structure functions in the predicted manner. As a result of such testing, it may be necessary to modify and refine the prototype to obtain the desired results.

Once a satisfactory prototype is obtained, a rubber mold of the prototype is formed. Typically, this step involves encasing the prototype in molten rubber and allowing the rubber to harden so as to form a rubber mold of the prototype. The rubber encasing the prototype is then split and the prototype is removed to yield an open rubber mold.

Once the rubber mold is obtained, it is used to form a wax casting. This step typically involves pouring molten wax into the rubber mold and allowing the wax to harden to form a wax casting of the support structure.

After the wax casting is obtained, it is used to form a plaster mold. This step typically involves encasing the wax casting and plaster, allowing the plaster to harden around the wax casting so as to form a plaster mold.

The plaster mold can then be used to form a support structure. Specifically, molten bearing material, such as bronze, is poured into the plaster mold so as to melt and displace the wax casting from the mold. Thus, the plaster mold is filled with molten material and the melted wax is removed from the plaster mold. After the molten material hardens, the plaster mold is removed from around the support structure.

As noted above, the first step in the investment casting method, indeed in any method, of producing support structures in accordance with the present invention is the production of a prototype bearing. The relatively complex support structures of the present invention can be formed using simple manufacturing techniques.

With the foregoing in mind, it is believed sufficient to describe the method of making a single support structure through the use of electrical discharge manufacturing and machining. A description of such manufacture demonstrates the ease with which the relatively complex bearing shapes of the present invention can be achieved.

Figure 5A:
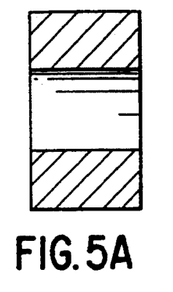
FIGS. 5A and 5B are cross sectional views of a cylindrical journal or blank prior to machining.
Figure 5B:
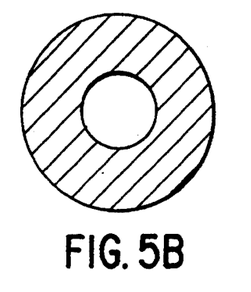
Figure 6A:
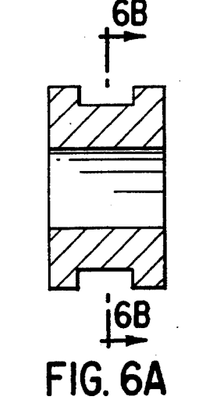
FIGS. 6A and 6B are cross sectional views of a machined journal or blank.
Figure 6B:
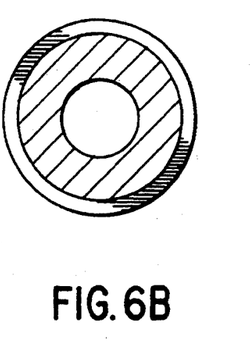
Figure 7A:
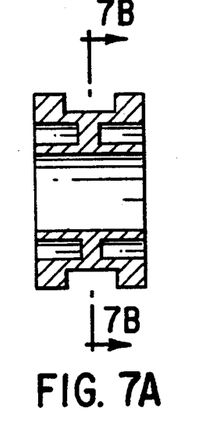
FIGS. 7A and 7B are cross-sectional views of a further machined journal or blank.
Figure 7B:
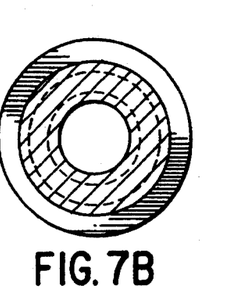
Figure 8A:
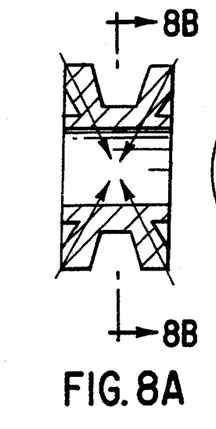
FIGS. 8A and 8B are cross sectional views of a modified machined journal or blank.
Figure 8B:
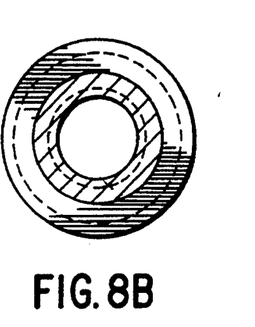

Each support is initially in the form of a cylindrical blank having a cylindrical bore as shown in FIGS. 5A and 5B. The blank is then machined to provide a radial lubricating fluid groove as shown in FIGS. 6A and 6B. For certain applications, it is desirable to further machine the blank to include facing grooves which are preferably symmetrically disposed on the radial faces of the support structure as shown in FIGS. 7A and 7B. The provision of such facing grooves ultimately results in a support which is easily torsionally deflected. While the groove shown in FIGS. 7A and 7B are cylindrical, it is possible to provide tapered grooves as shown in FIGS. 8A and 8B. This yields a support structure which exhibits improved deflection characteristics by virtue of the angled alignment of the support beams if it is preferable that the support beams converge at a point proximate the center line of the shaft. This ensures that flexibility occurs about the shaft center line by establishing a center of action for the entire system such that the support may adjust to shaft misalignment. In essence, the tapering of the support beams causes the support to act in a manner similar to a spherical bearing by concentrating the support forces on a single point about which the shaft may pivot in all directions to correct any misalignment. The arrows in FIG. 8A illustrate the lines of action of the deflection.

Figure 8C:
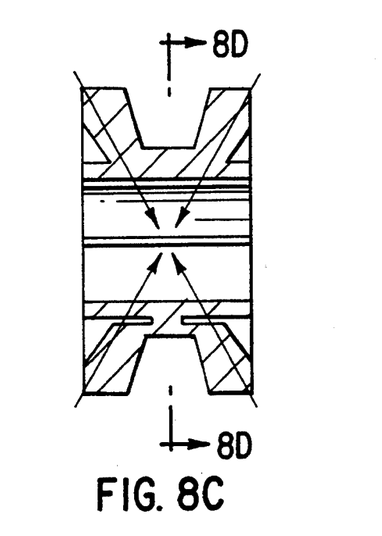
FIGS. 8C and 8D are cross sectional views of a support structure constructed from the modified machined journal or blank of FIGS. 8A and 8B.
Figure 8D:
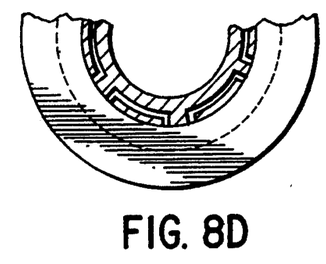

After the cylindrical blank is properly machined as shown in FIGS. 6A and 6B, FIGS. 7A and 7B, or FIGS. 8A and 8B radial and/or circumferential slits or grooves are formed along the radial face of the machined blank to define the support ring or support pads, the beam supports and the housing. FIGS. 8C and 8D illustrate such grooves formed in the machined blank of FIGS. 8A and 8B.

When manufacturing low volumes of the support structures or prototypes of the support structures for use in the construction of a mold, the cuts or slits are preferably formed through electrical discharge manufacturing or through the use of a laser. The machining of the cylindrical blanks to achieve the configurations illustrated in FIGS. 6A and 6B, FIGS. 7A and 7B, FIGS. 8A and 8B or a similar shape can be done through conventional machine tools such as a lathe or the like.

The performance characteristics of the support structures of the present invention result from the relative shape, size, location and material characteristics of the support member defined by the bores and cuts or slits formed in the machined blank. These parameters are largely defined by the dimensions and location of the radial circumferential bores, cuts or slits formed in the support structure in conjunction with the shape of the machined blank in which the bores or slits are formed to yield the support structure.

While the construction of the support structures of the present invention is most easily understood by reference to the machining process, larger quantities are preferably manufactured through the investment casting method of the present invention, and even larger scale production of the support structures contemplated by the present invention could be more economically performed through injection molding, casting, powdered metal, die casting, extrusion or the like.

In extruding a large number of support structures from a pipe-like cylindrical blank, radial lubricating fluid grooves, as shown in FIGS. 6A and 6B can be provided along the length of the pipe-like cylindrical blank prior to extrusion. However, if facing grooves were desired in the support structure these can be individually defined after slicing the individual support structure from the extruded and machined blank. For this reason, extrusion might not be a preferred method of producing support structure which require facing grooves to enhance torsional flexibility.

Optimization of the support structure configuration for individual applications precludes high stresses and insures long life. The absence of moving parts eliminates pivot wear and durability concerns by eliminating the pivot pad contact stresses. Manufacturing tolerances are completely eliminated in all but the final support ring bore, thus simplifying the manufacturing process. EDM manufacturing is efficient and accurate for low volume applications, while high volume applications can be cast, molded, extruded or forged as discussed herein.

I claim:

1. A bearing, the bearing comprising:
    an inner race;
    an outer race;
    a plurality of rolling elements disposed between the inner race and the outer race such that the inner race is rotatably supported on the outer race by the rolling elements; and
    a support structure for supporting the outer race, the support structure comprising a plurality of circumferentially spaced pads each having two circumferential ends, each pad being supported on the outer periphery of the support structure by a beam network, the beam network comprising a circumferential beam extending from each circumferential end of the pad and a radially extending beam extending between the circumferential beam and the outer periphery of the housing.

2. The bearing of claim 1, further comprising a plurality of deflection control members inserted into the unitary support structure to control deflection of the beam network.

3. The bearing of claim 1, wherein the support structure comprises a one-piece member formed with cuts and grooves to define a plurality of beams.

4. The bearing of claim 3, wherein at least some of the cuts and grooves are formed by electro-discharge machining.

5. The bearing of claim 1, wherein the support structure is dampened by an uncompressible fluid.

6. The bearing of claim 1, wherein the support structure is formed of a single piece of material.

7. The bearing of claim 1, wherein the pads each include a damper portion extending radially outward toward the outer periphery so as to define a thin gap between the damper portion and the outer periphery of the support structure.

8. The bearing of claim 1, wherein each of the pads has an arcuate face having an inner diameter and wherein the inner diameter of the arcuate face of each of the pads is greater than the outer diameter of the outer race of the rolling element bearing such that the outer race of the rolling element bearing contacts the pads proximate the circumferential center of the pads so that loads are applied in the proximity of the circumferential center of the pads.

9. A dampened bearing assembly, the bearing assembly comprising:
   a rolling element bearing having an annular inner race, an annular outer race having a predetermined diameter, and a plurality of rolling elements disposed between the inner race and the outer race such that the inner race is rotatably supported on the outer race by the rolling elements;
   a support structure for supporting the outer race for radial movement, the support structure having an outer periphery and comprising a plurality of circumferentially spaced pads each having two circumferential ends, each pad being supported by a beam network on the outer periphery of the support structure and the pads each including a damper portion extending radially outward away from the outer surface and toward the outer periphery so as to define a thin gap between the damper portion and the outer periphery of the support structure; and
   a supply of incompressible fluid located within the thin gap between the damper portion and the outer periphery of the support structure.

10. The dampened bearing assembly of claim 9, wherein the beam network comprises a circumferential beam extending from each circumferential end of the pad and a radially extending beam extending between the circumferential beam and the outer periphery of the housing.

11. The dampened bearing assembly of claim 9, wherein each of the pads has an arcuate face having an inner diameter and wherein the inner diameter of the arcuate face of each of the pads is greater than the outer diameter of the outer race of the rolling element bearing such that the outer race of the rolling element bearing contacts the pads proximate the circumferential center of the pads so that loads are applied in the proximity of the circumferential center of the pads.

12. A bearing assembly comprising a bearing for supporting a shaft for rotation and a support structure for supporting the bearing for radial movement, the support structure comprising: an outer periphery surrounding the bearing and a plurality of circumferentially spaced support sections located between the outer periphery and the bearing for supporting the bearing on the outer periphery, each support section comprising a substantially rigid support pad having two circumferential ends and at least one portion in contact with the bearing, and at least one spring like element supporting each end for the pad so as to permit radial movement of the pad with respect to the outer periphery.

13. The bearing of claim 12, wherein the support structure is fluid dampened.

14. The bearing of claim 12, wherein the pads, spring-like elements and outer periphery are integrally formed as a single piece.

15. A dampened bearing assembly, the bearing assembly comprising:
   a rolling element bearing having an annular inner race, an annular outer race, and a plurality of rolling elements disposed between the inner race and the outer race such that the inner race is rotatably supported on the outer race by the rolling elements;
   a support structure for supporting one of the races so as to provide damping for the rolling element bearing, the support structure comprising a plurality of circumferentially spaced pads, each of the pads having two circumferentially spaced edges, and an arcuate pad surface at least a portion of which is in contact with one of the annular races, at least two beams integrally formed with and supporting each pad, a first one of the two beams supporting the pad proximate one circumferentially spaced edge and the second one of the two beams supporting the pad proximate the other circumferentially spaced edge, the two beams being shaped, oriented and supported so as to permit radial movement of the pads, and an incompressible fluid located within the bearing assembly adjacent the pads, said radial movement of the pads being dampened by the incompressible fluid.

16. The dampened bearing assembly of claim 15, wherein the two beams supporting the pad comprise radially extending beams.

17. The dampened bearing assembly of claim 16, wherein the support structure further comprises a network of additional beams which support the two radially extending beams for radial movement.

18. The dampened bearing assembly of claim 15, wherein the beams which support each pad are circumferential beams extending from the circumferential ends of the pad and wherein each of these circumferential beams is supported by a radially extending beam extending between the circumferential beam and the other periphery of the housing.

19. The dampened bearing assembly of claim 18, further comprising a plurality of deflection control inserts, the deflection control inserts being located between adjacent radially extending beams to prevent the beams from deflecting toward the deflection control insert.

20. The dampened bearing assembly of claim 15, wherein the support structure is formed of a single piece of material.

21. The dampened bearing assembly of claim 15, wherein the support structure includes an outer periphery and the pads each include a damper portion extending radially outward toward the outer periphery of the support structure so as to define a thin gap between the damper portion and the outer periphery of the support structure.

22. The dampened bearing assembly of claim 15, wherein the arcuate pad surface of each of the pads has an inner diameter which is greater than the outer diameter of the outer race of the rolling element bearing such that the outer race of the rolling element bearing contacts the pads proximate the circumferential center of the pads so that loads are applied in the proximity of the circumferential center of the pads.

23. The dampened bearing assembly of claim 15, wherein the support structure comprises a one-piece member formed with cuts and grooves to define a plurality of beams and all of the circumferentially spaced pads.

* * * * *